United States Patent
Yi et al.

(10) Patent No.: US 8,032,147 B2
(45) Date of Patent: *Oct. 4, 2011

(54) APPARATUS AND METHOD FOR SUPPORTING MOBILITY OF WIRELESS TERMINAL IN WIRELESS COMMUNICATION NETWORK

(75) Inventors: Seung June Yi, Seoul (KR); Young Dae Lee, Kyoungki-do (KR); Sung Duck Chun, Seoul (KR)

(73) Assignee: LG Electronics Inc., Seoul (KR)

( * ) Notice: Subject to any disclaimer, the term of this patent is extended or adjusted under 35 U.S.C. 154(b) by 572 days.

This patent is subject to a terminal disclaimer.

(21) Appl. No.: 12/013,359

(22) Filed: Jan. 11, 2008

(65) Prior Publication Data

US 2008/0108368 A1  May 8, 2008

Related U.S. Application Data

(63) Continuation of application No. 10/845,204, filed on May 12, 2004, now Pat. No. 7,349,703.

(30) Foreign Application Priority Data

May 13, 2003 (KR) .............................. 2003-0030271

(51) Int. Cl.
*H04W 72/00* (2009.01)
(52) U.S. Cl. ............... 455/452.1; 455/426.1; 455/552.1; 455/553.1; 455/515; 455/432.1; 370/395.2
(58) Field of Classification Search ............... 455/426.1, 455/552.1, 553.1, 515, 432.1, 432.2, 432.3, 455/433, 452.1, 452.2; 370/395.2
See application file for complete search history.

(56) References Cited

U.S. PATENT DOCUMENTS

| | | | | |
|---|---|---|---|---|
| 7,349,703 | B2 * | 3/2008 | Yi et al. ..................... | 455/452.2 |
| 2001/0031641 | A1 | 10/2001 | Ung et al. | |
| 2003/0104801 | A1 | 6/2003 | Koulakiotis et al. | |
| 2003/0119452 | A1 * | 6/2003 | Kim et al. ........................ | 455/69 |
| 2003/0134653 | A1 | 7/2003 | Sarkkinen et al. | |
| 2008/0108368 | A1 * | 5/2008 | Yi et al. ..................... | 455/452.2 |

FOREIGN PATENT DOCUMENTS

| | | |
|---|---|---|
| CA | 2280371 | 2/2001 |
| CA | 2354866 | 5/2001 |
| EP | 1309213 | 5/2003 |

(Continued)

OTHER PUBLICATIONS

Nokia "On MBMS Notifications and Service Announcements" TSG-RAN WG2 meeting #31, Aug. 19-23, 2002.*

(Continued)

*Primary Examiner* — Kamran Afshar
*Assistant Examiner* — Sayed T Zewari
(74) *Attorney, Agent, or Firm* — Lee, Hong, Degerman, Kang & Waimey

(57) ABSTRACT

A method and apparatus for informing terminals in a UMTS regarding state information of an MBMS in order to prevent terminals from requesting a service that cannot be provided in a cell in which it is newly located. The mobile communication network informs the terminals about its service provision state for a particular MBMS service being provided, and the terminals operate in accordance with this service provision state information to minimize unnecessary operations of the terminal and unnecessary signaling and waste of radio resources.

4 Claims, 11 Drawing Sheets

FOREIGN PATENT DOCUMENTS

| | | |
|---|---|---|
| GB | 2265522 | 9/1993 |
| KR | 1020010111077 | 12/2001 |
| KR | 20020020566 | 3/2002 |
| RU | 2149518 | 5/2000 |
| RU | 2173503 | 9/2001 |
| WO | 00/13379 | 3/2000 |
| WO | 00/21318 | 4/2000 |
| WO | 00/35234 | 6/2000 |
| WO | 0078068 | 12/2000 |
| WO | 01/56236 | 8/2001 |
| WO | 2004002184 | 12/2003 |

OTHER PUBLICATIONS

Siemens "Considerations on MBMS Notification" 3GPP RAN 2 and RAN 3 Joint MBMS Meeting, Jan. 15-16, 2003.

Samsung, "Singaling flows for MBMS" 3GPP TSG RAN WG2 #33, R2-022980, Nov. 12, 2002.

Siemens "MBMS group notification" 3GPP TSG RAN WG2 #35, R2-030676, Apr. 7, 2003.

3rd Generation Partnership Project, "Technical Specification Group Radio Access Network; Introduction of the Multimedia Broadcast Multicast Service (MBMS) in the Radio Access Network," R2-030707, 3GPP TS 25.346 V1.5.0, Mar. 2003.

\* cited by examiner

APPARATUS AND METHOD FOR SUPPORTING MOBILITY OF WIRELESS TERMINAL IN WIRELESS COMMUNICATION NETWORK

CROSS-REFERENCE TO RELATED APPLICATIONS

This application is a continuation of U.S. application Ser. No. 10/845,204, filed May 12, 2004, now U.S. Pat. No. 7,349,703, which pursuant to 35 U.S.C. §119(a) claims the benefit of earlier filing date and right of priority to Korean Application No. 2003-0030271, filed on May 13, 2003, the contents of all of which are hereby incorporated by reference herein in their entirety.

BACKGROUND OF THE INVENTION

1. Field of the Invention

The present invention relates to a method and apparatus for providing an MBMS (multimedia broadcast/multicast service) for UMTS (Universal Mobile Telecommunication System) that supports the mobility of a terminal and, more particularly, a method and apparatus for informing a terminal regarding state information of MBMS in order to prevent the terminal from requesting a service that cannot be provided.

2. Description of the Related Art

A universal mobile telecommunication system (UMTS) is a European-type, third generation IMT-2000 mobile communication system that has evolved from a European standard known as Global System for Mobile communications (GSM). UMTS is intended to provide an improved mobile communication service based upon a GSM core network and wideband code division multiple access (W-CDMA) wireless connection technology.

In December 1998, a Third Generation Partnership Project (3GPP) was formed by the ETSI of Europe, the ARIB/TTC of Japan, the T1 of the United States, and the TTA of Korea. The 3GPP creates detailed specifications of UMTS technology. In order to achieve rapid and efficient technical development of the UMTS, five technical specification groups (TSG) have been created within the 3GPP for standardizing the UMTS by considering the independent nature of the network elements and their operations.

Each TSG develops, approves, and manages the standard specification within a related region. Among these groups, the radio access network (RAN) group (TSG-RAN) develops the standards for the functions, requirements, and interface of the UMTS terrestrial radio access network (UTRAN), which is a new radio access network for supporting W-CDMA access technology in the UMTS.

FIG. 1 illustrates an exemplary basic structure of a general UMTS network. As shown in FIG. 1, the UMTS is roughly divided into a terminal or user equipment (UE) 10, a UTRAN 20, and a core network (CN) 30.

The UTRAN 20 includes one or more radio network subsystems (RNS) 25. Each RNS 25 includes a radio network controller (RNC) 23 and a plurality of Node-Bs (base stations) 21 managed by the RNC 23. The RNC 23 handles the assignment and management of radio resources and operates as an access point with respect to the core network 30.

The Node-Bs 21 receive information sent by the physical layer of the terminal 10 through an uplink and transmit data to the terminal 10 through a downlink. The Node-Bs 21 operate as access points of the UTRAN 20 for the terminal 10.

The UTRAN 20 constructs and maintains a radio access bearer (RAB) for communication between the terminal 10 and the core network 30. The core network 30 requests end-to-end quality of service (QoS) requirements from the RAB, and the RAB supports the QoS requirements the core network 30 has set. Accordingly, by constructing and maintaining the RAB, the UTRAN 20 can satisfy the end-to-end QoS requirements.

The services provided to a specific terminal 10 are roughly divided into the circuit switched (CS) services and the packet switched (PS) services. For example, a general voice conversation service is a circuit switched service, while a Web browsing service via an Internet connection is classified as a packet switched (PS) service.

For supporting circuit switched services, the RNCs 23 are connected to the mobile switching center (MSC) 31 of the core network 30 and the MSC 31 is connected to the gateway mobile switching center (GMSC) 33 that manages the connection with other networks. For supporting packet switched services, the RNCs 23 are connected to the serving general packet radio service (GPRS) support node (SGSN) 35 and the gateway GPRS support node (GGSN) 37 of the core network 30. The SGSN 35 supports the packet communications with the RNCs 23 and the GGSN 37 manages the connection with other packet switched networks, such as the Internet.

FIG. 2 illustrates a structure of a radio interface protocol between the terminal 10 and the UTRAN 20 according to the 3GPP radio access network standards. As shown in FIG. 2, the radio interface protocol has horizontal layers comprising a physical layer, a data link layer, and a network layer, and has vertical planes comprising a user plane (U-plane) for transmitting user data and a control plane (C-plane) for transmitting control information.

The user plane is a region that handles traffic information with the user, such as voice or Internet protocol (IP) packets. The control plane is a region that handles control information for an interface with a network, maintenance and management of a call, and the like.

The protocol layers in FIG. 2 can be divided into a first layer (L1), a second layer (L2), and a third layer (L3) based on the three lower layers of an open system interconnection (OSI) standard model.

The first layer (L1), namely, the physical layer, provides an information transfer service to an upper layer by using various radio transmission techniques. The physical layer is connected to an upper layer called a medium access control (MAC) layer, via a transport channel. The MAC layer and the physical layer exchange data via the transport channel.

The second layer (L2) includes a MAC layer, a radio link control (RLC) layer, a broadcast/multicast control (BMC) layer, and a packet data convergence protocol (PDCP) layer.

The MAC layer handles mapping between logical channels and transport channels and provides allocation of the MAC parameters for allocation and re-allocation of radio resources. The MAC layer is connected to an upper layer called the radio link control (RLC) layer, via a logical channel.

Various logical channels are provided according to the type of information transmitted. In general, a control channel is used to transmit information of the control plane and a traffic channel is used to transmit information of the user plane.

A logical channel may be a common channel or a dedicated channel depending on whether the logical channel is shared. Logical channels include a dedicated traffic channel (DTCH), a dedicated control channel (DCCH), a common traffic channel (CTCH), a common control channel (CCCH), a broadcast control channel (BCCH), and a paging control channel (PCCH). The BCCH provides information including information utilized by a terminal 10 to access a system. The PCCH is used by the UTRAN 20 to access a terminal 10.

The MAC layer is connected to the physical layer by transport channels and can be divided into a MAC-b sub-layer, a MAC-d sub-layer, a MAC-c/sh sub-layer, and a MAC-hs sub-layer according to the type of transport channel being managed. The MAC-b sub-layer manages a BCH (Broadcast Channel), which is a transport channel handling the broadcasting of system information. The MAC-c/sh sub-layer manages a common transport channel, such as a forward access channel (FACH) or a downlink shared channel (DSCH), which is shared by a plurality of terminals. The MAC-d sub-layer manages a dedicated channel (DCH), which is a dedicated transport channel for a specific terminal 10. Accordingly, the MAC-d sublayer is located in a serving RNC (SRNC) that manages a corresponding terminal, and one MAC-d sublayer also exists in each terminal.

The RLC layer supports reliable data transmissions and performs segmentation and concatenation on a plurality of RLC service data units (SDUs) delivered from an upper layer. When the RLC layer receives the RLC SDUs from the upper layer, the RLC layer adjusts the size of each RLC SDU in an appropriate manner based upon processing capacity and then creates data units by adding header information thereto. The data units, called protocol data units (PDUs), are transferred to the MAC layer via a logical channel. The RLC layer includes a RLC buffer for storing the RLC SDUs and/or the RLC PDUs.

The BMC layer schedules a cell broadcast (CB) message transferred from the core network and broadcasts the CB message to terminals 10 positioned in a specific cell or cells.

The PDCP layer is located above the RLC layer. The PDCP layer is used to transmit network protocol data, such as the IPv4 or IPv6, effectively on a radio interface with a relatively small bandwidth. For this purpose, the PDCP layer reduces unnecessary control information used in a wired network, a function called header compression.

The radio resource control (RRC) layer located at the lowest portion of the third layer (L3) is only defined in the control plane. The RRC layer controls the transport channels and the physical channels in relation to setup, reconfiguration, and the release or cancellation of the radio bearers (RBs). The RB signifies a service provided by the second layer (L2) for data transmission between the terminal 10 and the UTRAN 20. In general, the set up of the RB refers to the process of stipulating the characteristics of a protocol layer and a channel required for providing a specific data service, and setting the respective detailed parameters and operation methods.

The RRC state refers to whether there exists a logical connection between the RRC of the terminal 10 and the RRC of the UTRAN 20. If there is a connection, the terminal 10 is said to be in RRC connected state. If there is no connection, the terminal 10 is said to be in idle state.

Because an RRC connection exists for terminals 10 in RRC connected state, the UTRAN 20 can determine the existence of a particular terminal within the unit of cells, for example which cell the RRC connected state terminal is in. Thus, the terminal 10 can be effectively controlled.

In contrast, the UTRAN 20 cannot determine the existence of a terminal 10 in idle state. The existence of idle state terminals 10 can only be determined by the core network 30 to be within a region that is larger than a cell, for example a location or a routing area. Therefore, the existence of idle state terminals 10 is determined within large regions, and, in order to receive mobile communication services such as voice or data, the idle state terminal must move or change into the RRC connected state.

The 3GPP system can provide multimedia broadcast multicast service (MBMS), which is a new type of service in Release 6. The 3GPP TSG SA (Service and System Aspect) defines various network elements and their functions required for supporting MBMS services. A cell broadcast service provided by the conventional Release 99 is limited to a service in which text type short messages are broadcast to a certain area. The MBMS service provided by Release 6 is a more advanced service that multicasts multimedia data to terminals (UEs) 10 that have subscribed to the corresponding service in addition to broadcasting multimedia data.

The MBMS service is a downward-dedicated service that provides a streaming or background service to a plurality of terminals 10 by using a common or dedicated downward channel. The MBMS service is divided into a broadcast mode and a multicast mode.

The MBMS broadcast mode facilitates transmitting multimedia data to every user located in a broadcast area, whereas the MBMS multicast mode facilitates transmitting multimedia data to a specific user group located in a multicast area. The broadcast area signifies a broadcast service available area and the multicast area signifies a multicast service available area.

FIG. 3 illustrates a process of providing a particular MBMS service, referred to as service 1, by using multicast mode. A user desiring to receive the MBMS service, for example UE1, first receives a service announcement provided by a network at the terminal 10. The service announcement provides the terminal 10 with a list of services to be provided and related information. In addition, the user must receive a service notification provided by the network. The service notification provides the terminal 10 with information related to the broadcast data to be transmitted.

If the user intends to receive the multicast mode MBMS service, the user subscribes to a multicast subscription group. A multicast subscription group is a group of users who have completed a subscription procedure. Once a user has subscribed to the multicast subscription group, the user can join a multicast group to receive a specific multicast service. A multicast group is a group of users that receive a specific multicast service. Joining a multicast group, also referred to as MBMS multicast activation, involves merging with the multicast group that has users who wish to receive the specific multicast service. Accordingly, the user can receive the specific multicast data by joining a multicast group, referred to as MBMS multicast activation. Each terminal 10 may individually subscribe to a multicast subscription group and join or leave a multicast group before, during, or any time after data transmission.

While a particular MBMS service is in progress, one or more sessions for that service may occur in sequence. When data to be transmitted for a particular MBMS service is generated at the MBMS data source, the core network 30 indicates the start of a session to the RNC 23. In contrast, when there is no further data to be transmitted for a particular MBMS service, the core network 30 indicates a session stop to the RNC 23.

Between session start and session stop, data transmission for the particular MBMS service is performed. Only those terminals 10 that have joined a multicast group for the MBMS service may receive data that during the data transmission.

In the session start procedure, the UTRAN 20 that received the session start from the core network 30 transmits an MBMS notification to the terminals 10. MBMS notification involves to UTRAN 20 informing the terminal 10 that transmission of data for a particular MBMS service within a certain cell is impending.

The UTRAN 20 can use the MBMS notification procedure to perform a counting operation that determines the number of terminals 10 that wish to receive a particular MBMS service within a particular cell. The counting procedure is used to determine whether the radio bearer for providing the particular MBMS service should be set as point-to-multipoint or point-to-point.

To select the MBMS radio bearer, the UTRAN 20 internally establishes a threshold value. After performing the counting function, the UTRAN 20 may set a point-to-point MBMS radio bearer if the number of terminals 10 existing within the corresponding cell is smaller than a threshold value and may set a point-to-multipoint MBMS radio bearer if the number of terminals existing within the corresponding cell is greater than or equal to the threshold value.

When a point-to-point radio bearer is set for a particular service, the terminals 10 wishing to receive the corresponding service are all in an RRC connected state. However, when a point-to-multipoint radio bearer is set for a particular service, all the terminals 10 wishing to receive the corresponding service need not be in an RRC connected state since terminals in an idle state may also receive the point-to-multipoint radio bearer.

In the related art, when a point-to-multipoint radio bearer is set for a particular service within a particular cell, the UTRAN 20 may allow some terminals 10 to stay in RRC connected state based upon radio resource managing conditions while requiring the remaining terminals to be in idle state. For example, when the UTRAN 20 receives an RRC connection request message from the terminals 10 wishing to receive a particular service, RRC connection setup messages are sent to a limited number of terminals according to the radio resource managing conditions for controlling the reception of the corresponding service in RRC connected state. RRC connection reject messages are transmitted to the other terminals 10 so that these terminals may receive the corresponding service in idle state.

FIG. 4 illustrates a signal flow chart indicating successful RRC connection setup according to the conventional art. After an MBMS session start message is received from the core network 30 in step S50, the UTRAN 20 transmits an MBMS notification message to those terminals 10 wishing to receive the corresponding MBMS service in step S52 to indicate that data transmission for the particular MBMS service is impending.

Each terminal 10 that receives the MBMS notification message transmits an RRC connection request message to the UTRAN 20 in step S54. The UTRAN 20 considers the current condition of radio resources and determines, in step S56, which RRC connections should be granted with a limited number of terminals 10 below a threshold value.

In step S58 the UTRAN 20 transmits RRC connection setup messages to the terminals selected for RRC connection. The terminals that receive the RRC connection setup message then transmit an RRC connection setup complete message to the UTRAN 20 in step S60. Upon successfully completing this procedure, an RRC connection exists between each selected terminal 10 and the UTRAN 20 and each selected terminal is in RRC connected state. In step S62, the UTRAN 20 allows those terminals not selected for RRC connection that desire to receive the MBMS service to set up a point-to-multipoint MBMS bearer.

FIG. 5 illustrates a signal flow diagram showing unsuccessful RRC connection setup according to the conventional art. After an MBMS session start message is received from the core network 30 in step S50, the UTRAN 20 transmits an MBMS notification message to those terminals 10 wishing to receive the corresponding MBMS service in step S52 to indicate that data transmission for the particular MBMS service is impending.

Each terminal 10 that receives the MBMS notification transmits an RRC connection request message to the UTRAN 20 in step S54. The UTRAN 20 considers the current condition of radio resources and determines, in step S56, which RRC connections should be granted with a limited number of terminals 10 below a threshold value.

As illustrated in FIG. 5, the UTRAN 20 determines that RRC connections should not be granted for those terminals 10 that exceed the threshold value, for example any terminal counted after the number of terminals reached the threshold value. The UTRAN 20 transmits, in step S59, RRC connection reject messages to those terminals 10 determined not to require an RRC connection. The terminals 10 receiving an RRC connection reject message are in idle state. In step S62, the UTRAN 20 allows those terminals 10 not selected for RRC connection that desire to receive the MBMS service to set up a point-to-multipoint MBMS bearer.

FIGS. 4 and 5 illustrate the procedure when there is at least one terminal 10 that desires to receive a particular MBMS service. However, if there are no terminals 10 that desire to receive a particular MBMS service as a result of the counting process, the UTRAN 20 does not set up a radio bearer and does not transmit MBMS data since setting up a radio bearer when there are no users who desire the service would waste radio resources.

When data of an MBMS service is transmitted from the core network 30 during one session of the MBMS service, the UTRAN 20 uses the established radio bearer to transmit the data. Upon receiving a session stop command from the core network, the established radio bearer is released by the UTRAN 20.

A terminal 10 that is receiving MBMS service within one cell may move to a different cell or a terminal may be powered on in a cell, thereby creating one of two situations depending upon whether the MBMS service data is also being transmitted to the cell.

The first situation occurs when the MBMS service data previously received by the terminal 10, or desired by a terminal that has been powered on, is being transmitted to the new cell in which the terminal resides. In order to allow the terminal 10 to receive the MBMS service data in the new cell, the UTRAN 20 informs the terminal 10 about the information related to the corresponding MBMS radio bearer within that cell until a session stop for the corresponding MBMS service is received.

Through this procedure, the terminal 10 that has moved to a new cell may receive information of the MBMS radio bearer that is transmitted via a common channel, such as the MCCH or BCCH, of the new cell in which the terminal now resides and the terminal may set up its parameters, or environment, such that the MBMS service can be continuously received. Also through this procedure, any terminal 10 that is powered on while a session of the MBMS service is in progress within a cell can receive information of the MBMS radio bearer that is transmitted via a common control channel and establish its parameters in order to receive the MBMS service data.

The second situation occurs when the MBMS service data previously received by a terminal 10, or desired by a terminal that has been powered on, is not being transmitted to the new cell in which the terminal resides. This situation arises because there are no terminals 10 in the new cell that receive the corresponding MBMS service prior to the terminal moving into, or being powered on in, that cell. If the terminal 10 that moved into, or was powered on in, the new cell cannot receive information about the radio bearer of the corresponding MBMS service, the terminal sets up a connection with the UTRAN 20 and requests that MBMS data be transmitted to the terminal.

Upon receiving a particular MBMS data transmission request from the terminal 10, the UTRAN 20 requests that the core network 30 transmit the MBMS service data. The UTRAN 20 then sets up an MBMS radio bearer for the corresponding cell and begins transmitting the MBMS data received from the core network 30 to the terminal 10. The UTRAN 20 also transmits the information related to the MBMS radio bearer via a common control channel until that session is completed.

Through the two abovementioned methods, a terminal 10 is able to receive an MBMS service even after moving into a different cell or after being powered on. However, the UTRAN 20 does not inform the terminal 10 about the state, or condition, of the particular MBMS service and the terminal operates without any knowledge of the state of the particular MBMS service. The terminal 10 may not operate properly if it requests data from the UTRAN 20 related to a particular MBMS service if the corresponding MBMS service session ended before the terminal moved to, or was powered on in, the new cell or if the new cell is not part of the service area.

Therefore, there is a need for a method and apparatus that facilitates informing a terminal regarding state information of MBMS in order to prevent the terminal from requesting a service that cannot be provided. The present invention addresses this and other needs.

SUMMARY OF THE INVENTION

The present invention is directed to a to a method and apparatus for providing state information to a terminal regarding a service the terminal desires to receive but which may not be available.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a mobile communication system and device that facilitates providing state information to a terminal regarding a service which the terminal desires to receive. Specifically, a method and apparatus is provided that allows the terminal to consider the availability of a particular service before requesting a network connection related to the service when the terminal first begins to operate in a cell.

In one aspect of the present invention, a method is provided for a terminal in radio communication with a network. The method includes a terminal subscribing to a particular service and operating for the first time in a cell in which the particular service is not being transmitted, receiving a control message from the network including an identification and state information related to a service being provided in the cell and comparing the identification of the provided service to the particular service to which the terminal subscribes in order to determine whether the service is available in the cell. The state information related to the provided service includes information indicating whether connection requests are being sought from terminals or if the provided service is currently being transmitted.

It is contemplated that the terminal may be operating for the first time in a cell due to being powered on or having relocated from another cell. By informing the terminal of the identity of the service being provided, the terminal can determine whether the particular service to which the terminal subscribes is not being transmitted because the service is not available in the cell. The terminal utilizes the service identification in the control message to determine if the service provided in the cell is the particular service to which the terminal subscribes.

If the service identification in the control message does not match the service identification of the particular service to which the terminal subscribes, the terminal determines that the particular service is not available in the cell and recognizes a "service not available" phase. The terminal will not waste radio resources by trying to initiate a connection process with the network, for example by transmitting a request message.

If the service identification in the control message matches the service identification of the particular service to which the terminal subscribes, the terminal determines that the particular service is available in the cell and recognizes a "service available" state. The terminal transmits a request message to the network to request the particular service.

Preferably the "service not available" state is a null phase in which there is either not an ongoing session of the particular service or the cell does not belong to the service area of the particular service. Preferably "service available" state is either a preparation phase, in which the network is currently performing a counting procedure to decide the type of radio bearer to establish based on the number of terminals in the cell that desire to receive the particular service, or a no-transmission state, in which there is no radio bearer established because there is no terminal in the cell that wants to receive the service.

Preferably the connection process is associated with the particular service, for example an MBMS service, and is initiated to obtain an RRC connection between the terminal and network. Preferably control message is an MBMS notification message and the request message is an RRC connection request message.

In another aspect of the present invention, a method is provided for a terminal in radio communication with a network. The method includes a terminal subscribing to a particular service and operating for the first time in a cell, receiving a control message from the network including an identification and state information related to a service being provided in the cell and comparing the identification of the provided service to the particular service to which the terminal subscribes in order to determine whether the particular service is available in the cell and, if the service is available, determine the connection process for receiving the service. The state information related to the provided service includes information indicating whether connection requests are being sought from terminals or if the provided service is currently being transmitted.

It is contemplated that the terminal may be operating for the first time in a cell due to being powered on or having relocated from another cell. By informing the terminal of the identity of the service being provided, the terminal can determine whether the particular service to which the terminal subscribes is not being transmitted because the service is not available in the cell. The terminal utilizes the service identification in the control message to determine if the service provided in the cell is the particular service to which the terminal subscribes.

The terminal utilizes the service identification in the control message to recognize a null phase in which the particular service to which the terminal subscribes is not available in the cell because there is either not an ongoing session of the particular service or the cell does not belong to the service area of the particular service. If the service identification in the control message does not match the service identification of the particular service to which the terminal subscribes, the terminal recognizes the null phase. The terminal will not waste radio resources by trying to initiate a connection process with the network, for example by transmitting a request message.

If the service identification in the control message matches the service identification of the particular service to which the terminal subscribes, the terminal acts pursuant to the state information in the control message to either transmit a connection request or establish a radio bearer. It is contemplated the state information of the control message may indicate a preparation phase, a point-to-point state, a point-to-multipoint state, and a no-transmission state.

In the preparation phase, the network is currently performing a counting procedure to decide the type of radio bearer to establish based on the number of terminals that desire to receive the particular service in the cell. In the no-transmission state, there is no radio bearer established because there is no terminal in the cell that desires to receive the service. The point-to-point state and point-to-multipoint state are states in which the particular service is currently being transmitted and radio bearers are established.

If the point-to-point state is indicated, the terminal establishes a point-to-point radio bearer in order to receive the particular service. If the point-to-multipoint state is indicated, the terminal establishes a point-to-multipoint radio bearer in order to receive the particular service. Preferably the radio bearer is an RRC connection between the terminal and the network. If the preparation phase or the no-transmission state is indicated, the terminal transmits a request message in order to receive the particular service.

Preferably the request message is an RRC connection request message associated with the particular service and the control message is an MBMS notification message. Preferably the service is an MBMS service.

In another aspect of the present invention, a method is provided for a terminal in radio communication with a network. The method includes a terminal subscribing to a particular service and operating for the first time in a cell, receiving a control message from the network including a service ID, a transmission state indicator and a counting status related to a service being provided in the cell, comparing the service identification of the provided service to the particular service to which the terminal subscribes in order to recognize a first phase, a second phase or a third phase, and determining whether to initiate a connection procedure with the network and how the connection procedure is initiated based on the recognized phase. The service ID is the identity of the service provided in the cell. The transmission state indicator indicates whether the provided service is presently being transmitted. The counting status indicates whether a counting operation is being performed.

The terminal utilizes the service ID in the control message to recognize the first phase, preferably a null phase in which the particular service to which the terminal subscribes is not available in the cell because there is either not an ongoing session of the particular service or the cell does not belong to the service area of the particular service. If the service ID in the control message does not match the service identification of the particular service to which the terminal subscribes, the terminal recognizes the first phase. The terminal will not waste radio resources by trying to initiate a connection process with the network, for example by transmitting a request message.

If the service ID in the control message matches the service identification of the particular service to which the terminal subscribes, the terminal recognizes that either the second phase or the third phase exists. The terminal initiates a connection procedure.

Preferably the second phase is a preparation phase in which the network is currently performing a counting procedure to decide the type of radio bearer to establish based on the number of terminals that want to receive the particular service in the cell. Preferably that third phase includes a no-transmission state, a point-to-point state and a point-to-multipoint state indicated by the transmission state indicator. The no-transmission state is a state in which in which there is no radio bearer established because there is no terminal in the cell that wants to receive the service. The point-to-point state and point-to-multipoint state are states in which the particular service is currently being transmitted and radio bearers are established.

The terminal utilizes the transmission state indicator and counting status in the control message to determine whether to initiate a connection procedure by transmitting a connection request or to establish a radio bearer. If the counting status indicates that a counting procedure is being performed or the transmission state indicator indicates that the provided service is not being transmitted, the terminal initiates a connection procedure by transmitting a connection request. If the transmission state indicator indicates that the provided service is being transmitted, the terminal establishes a point-to-point or point-to-multipoint radio bearer based on the type of transmission indicated by the transmission state indicator.

In another aspect of the present invention, a method is provided for a network in radio communication with a plurality of terminals. The method includes receiving a service session start indication, determining the number of terminals in a cell that presently subscribe to the service and transmitting a control message including a service identification and state information to solicit a connection request if there are no terminals that presently subscribe to the service.

The service session start indication is preferably received from the core network and is related to an MBMS service. Upon receiving the session start indication, a counting operation is performed to determine if any terminals presently subscribe to the service.

After the counting operation is done, a control message, for example an MBMS notification message, is transmitted to the terminals. The control message includes an identification of the service. If there are no terminals presently subscribing to the service, the control message also includes state information associated with soliciting a connection request from at least one of the terminals. The state information further includes a transmission state indicator which indicates either a preparation phase or a no-transmission state.

It is contemplated that the method may include transmitting a control message including a transmission state indicator which indicates a type of radio bearer established if there is at least one terminal that presently subscribes to the service. The transmission state indicator may indicate either point-to-multipoint radio bearer or a point-to-point radio bearer was established based on the number of terminals presently subscribing to the service.

It is further contemplated that the method may include receiving a service session stop indication and entering a null phase. The null phase may include releasing any established radio bearers and halting transmission of the control message including identification and state information related to a service.

It is also contemplated that the method may include detecting a terminal newly introduced into the cell and providing a control message to inform the terminal of the state of the service. The control message includes state information associated with soliciting a connection request from the newly introduced terminal if there are no other terminals presently subscribing to the service and a transmission state indicator indicating the type of radio bearer established with the newly introduced terminal if there is at least one other terminal presently subscribing to the service.

In another aspect of the present invention, a terminal is provided for radio communication with a network. The terminal includes a receiver, a transmitter, a display, a memory unit and a processing unit.

The receiver receives a control message including a service identification and service state information associated with a service provided by the network when the terminal is first introduced into a cell. The transmitter initiates a network connection process associated with the service by transmitting a connection request to the network. The display conveys information to a user. The memory unit stores information related to network connections and the user service. The processing unit performs the methods of the present invention to determine whether to initiate a connection process with the network based on the service identification and service state information in the control message.

In another aspect of the present invention, a network is provided for radio communication with a plurality of terminals. The terminal includes a receiver, a transmitter, a storage unit, and a controller.

The receiver receives connection requests from terminals in a cell subscribing to a service. The transmitter transmits a control message to the terminals in the cell. The storage unit stores information related to network connections, the user service and the capability of the terminals to provide feedback information associated with the service. The controller performs the methods of the present invention to receive a service start indication from the core network, determine the number of terminals in the cell that presently subscribe to the service, send a control message to the terminals including a service identification and service state information that either solicits a connection request from at least one terminal or indicates a type of radio bearer established based on the number of terminals presently subscribing to the service, and enter a null phase upon receiving a service stop indication from the core network.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

The present invention is directed to a to a method and apparatus for providing state information to a terminal regarding a service the terminal desires to receive in a new cell in which the terminal first operates such that the terminal may determine if the service is available and the process for receiving the service. Although the present invention is illustrated with respect to a mobile communication system such as a UMTS developed by the 3GPP, and specifically an RRC connection associated with an MBMS user service, it is contemplated that the methods and apparatus described herein may also be applied to a communication system operating under similar and/or different standards when it is desired to provide information to a terminal when it first operates in a new cell.

The present invention provides a communication system that supports terminal mobility and effectively utilizes radio resources to provide a particular service to a terminal 400 by having the system inform the terminal regarding the state, or condition, of the particular service. In a wireless radio system that transmits a broadcast and/or multicast service to a plurality of terminals 400 via a downlink channel, the UTRAN 520 informs terminals of the state of a particular broadcast and/or multicast service.

Information regarding the service state, or condition, of the UTRAN 520 that may be provided to a terminal 400 include the UTRAN preparing data transmission of a corresponding service, the UTRAN transmitting the data of the corresponding service using a point-to-point radio bearer or a point-to-multipoint radio bearer, the UTRAN not transmitting the data of the corresponding service, but waiting for a request for the data of the corresponding service from a terminal, and the location region of the UTRAN is not within the service region or the session of the corresponding service is not in progress. By transmitting the state of the particular service, problems associated with a terminal 400 unnecessarily requesting service data from the UTRAN 520 when the UTRAN is not operating in session or its location is not within a service region are minimized.

Figure 1:
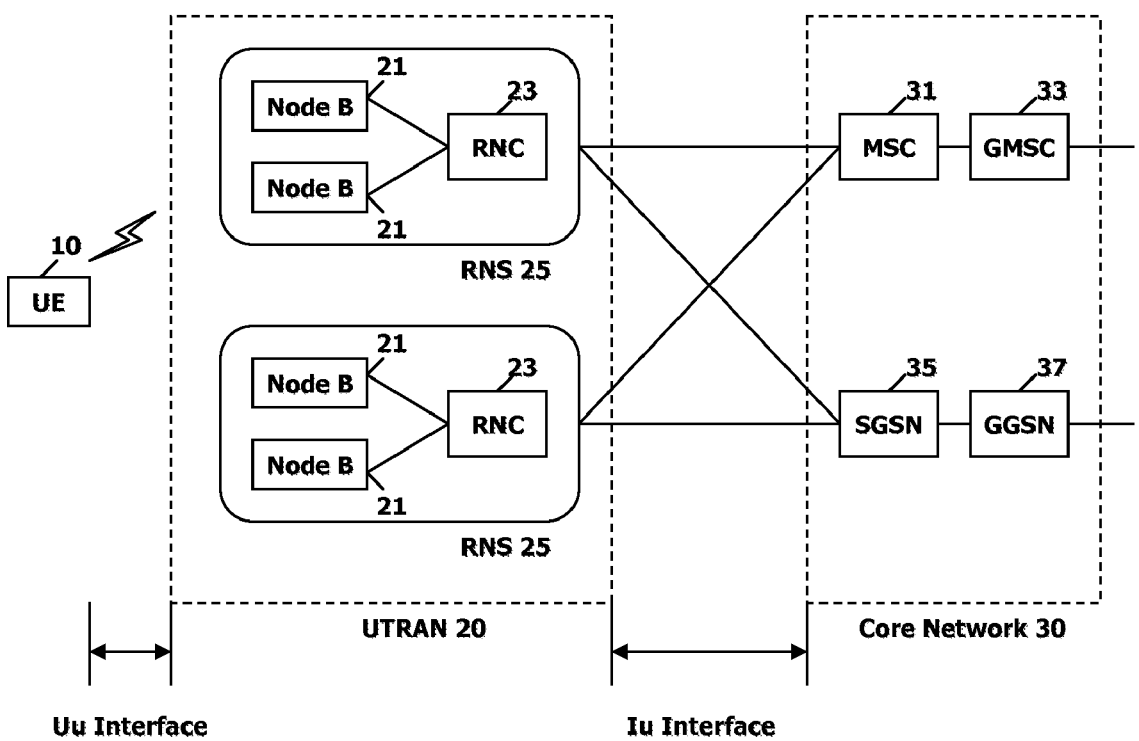
FIG. 1 illustrates a network structure of a general 3GPP UMTS system.
Figure 2:
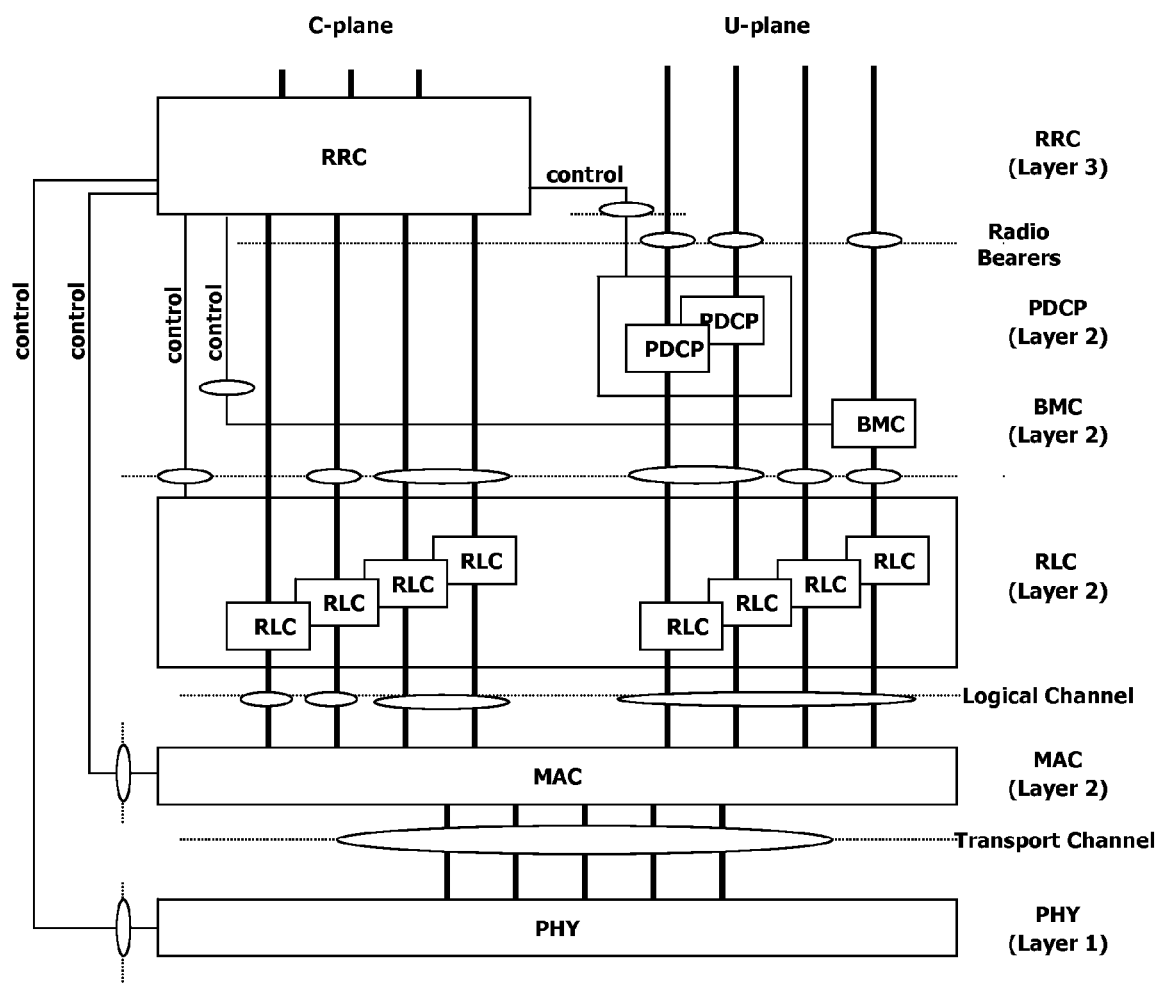
FIG. 2 illustrates an exemplary basic structure of a general UMTS network.
Figure 3:
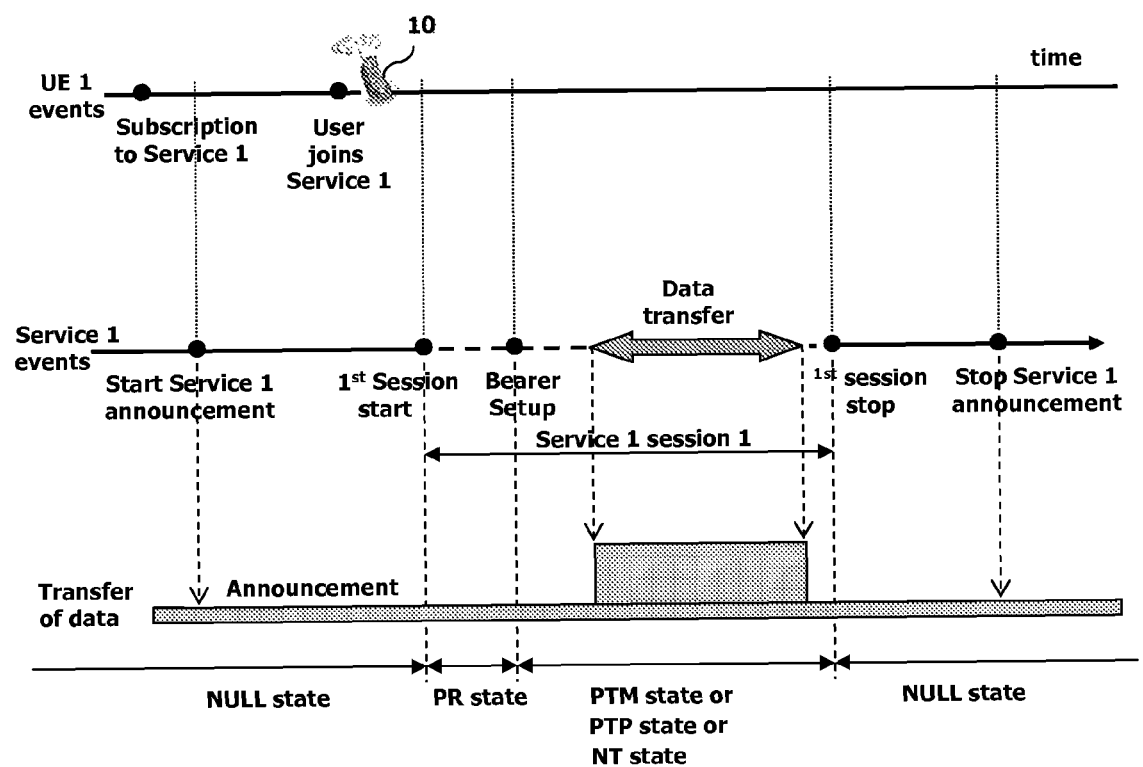
FIG. 3 illustrates an exemplary timeline for a conventional art UMTS network providing a particular MBMS service.
Figure 4:
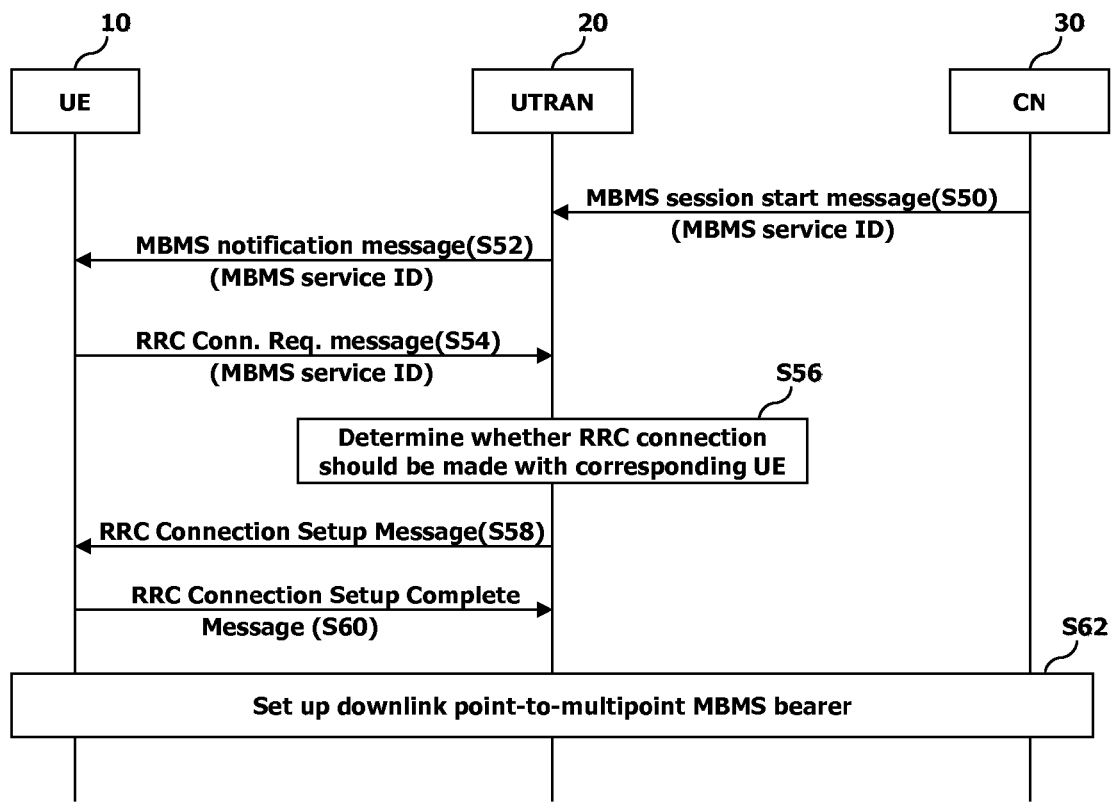
FIG. 4 illustrates the conventional art procedure when the UTRAN accepts the RRC connection request of a terminal.
Figure 5:
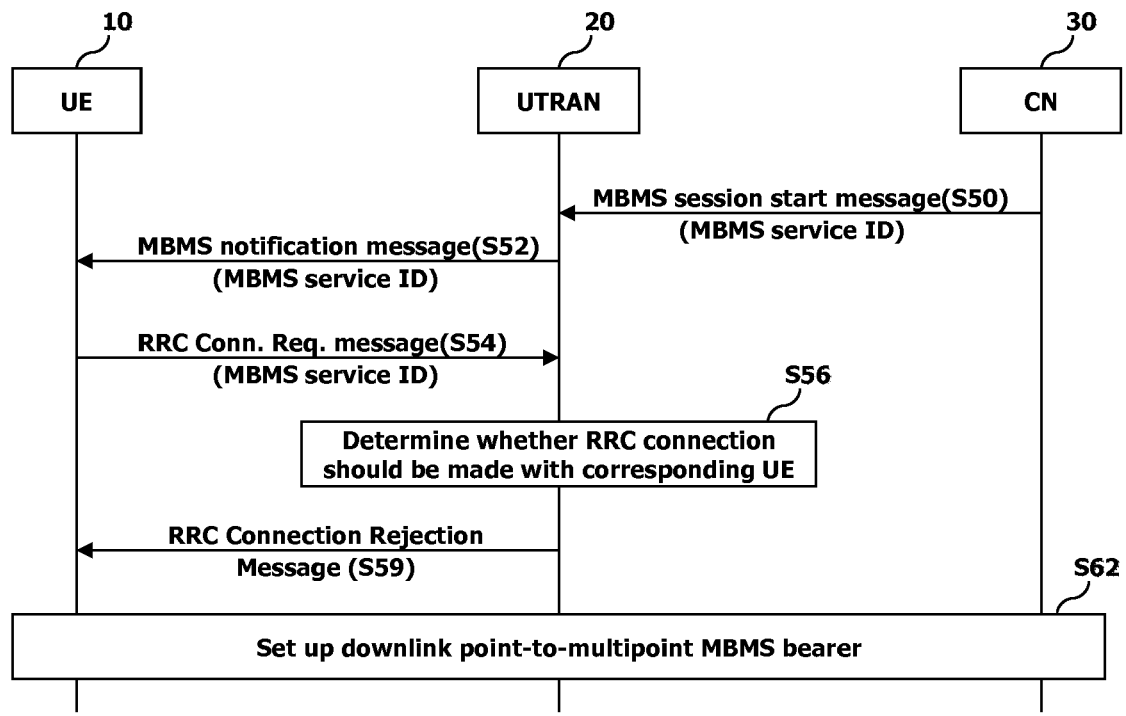
FIG. 5 illustrates the conventional art procedure when the UTRAN rejects the RRC connection request of a terminal.
Figure 6:
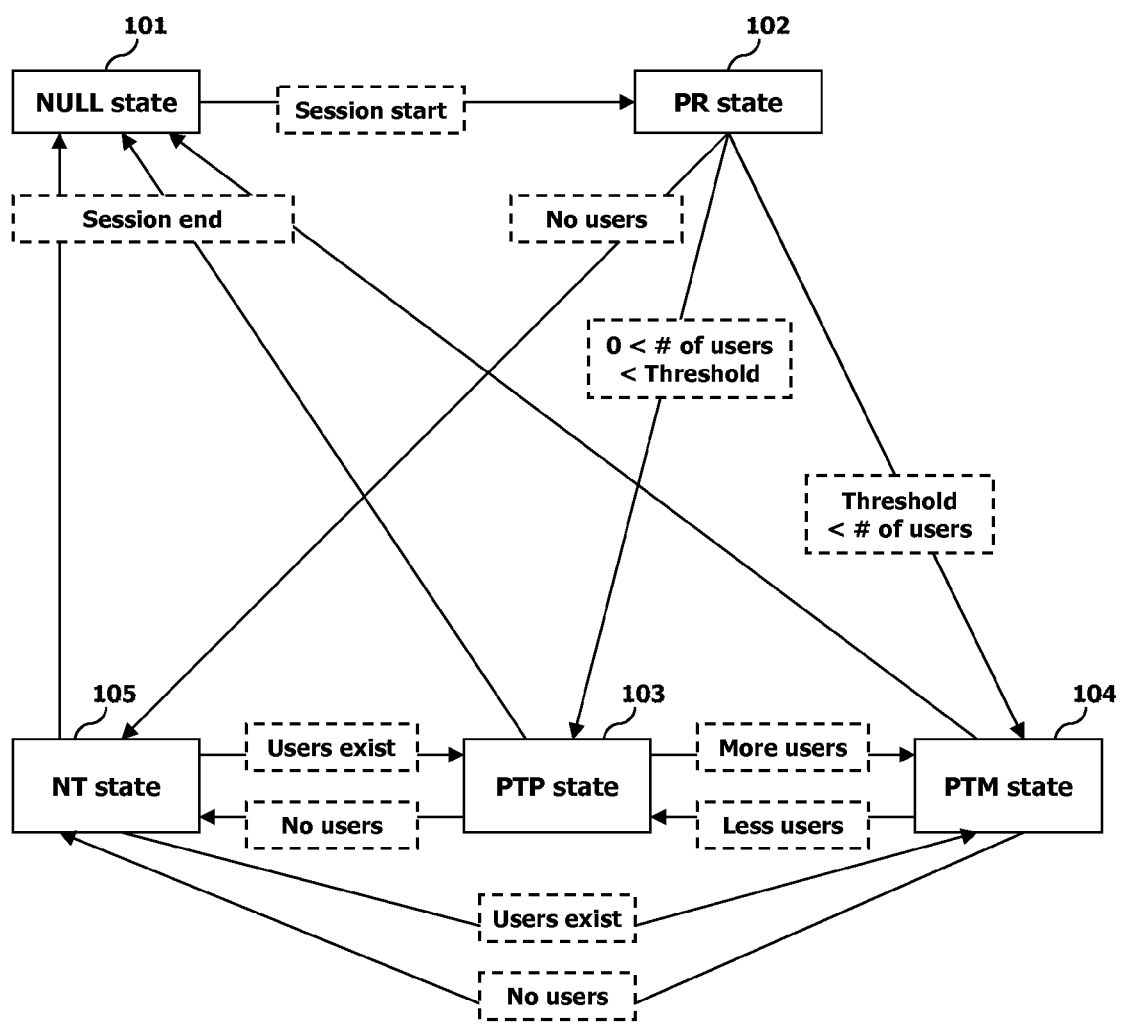
FIG. 6 illustrates the transition of service provision states according to the a first embodiment of the present invention.
Figure 7:
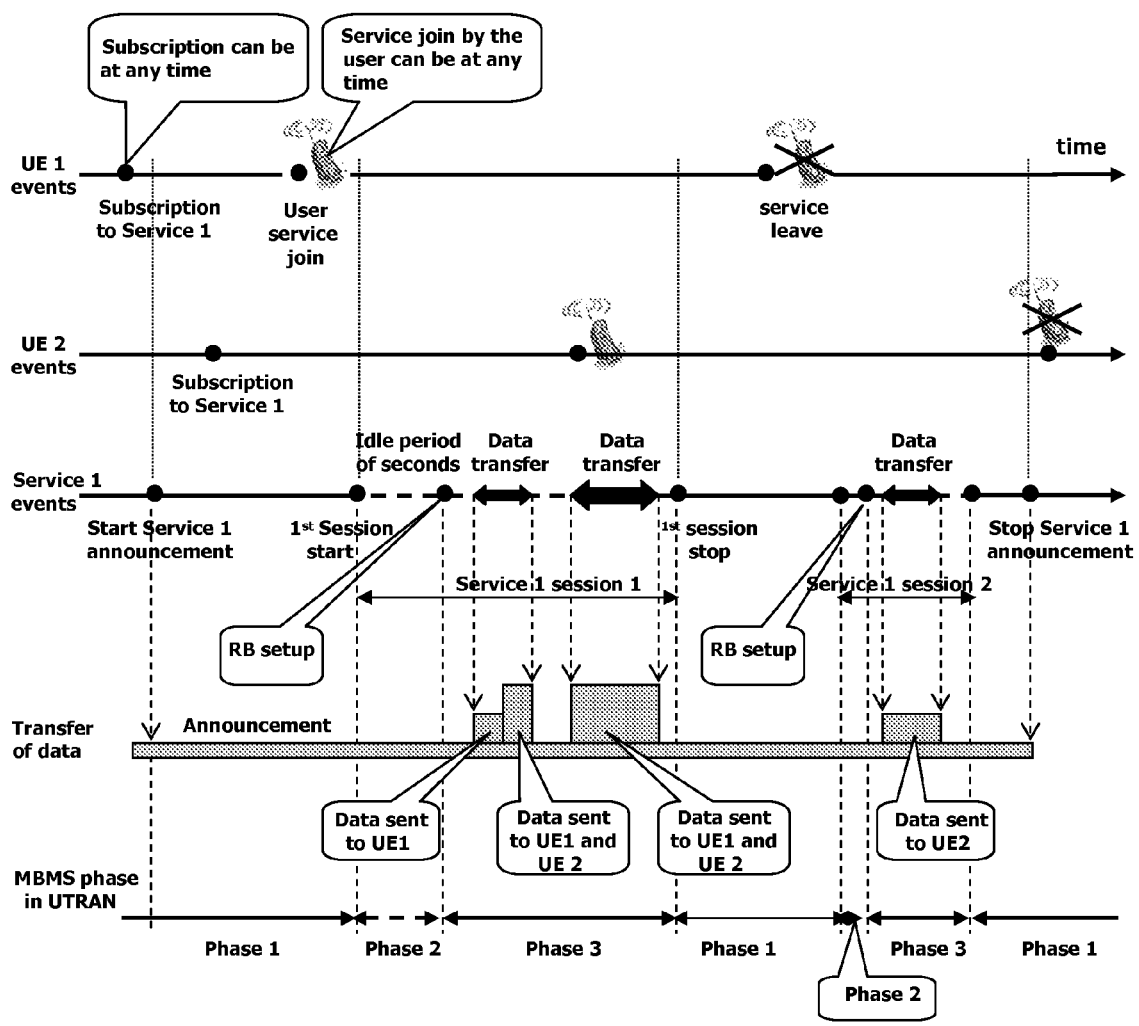
FIG. 7 illustrates a timeline for providing MBMS service according to a second embodiment the present invention.

In a first embodiment of the present invention, the UTRAN 520 operations for a particular broadcast and/or multicast service are divided into five of states and managed. FIG. 7 illustrates transitions between the five states.

The first state is a null (NULL) state 101, in which there is either no ongoing session for the MBMS service or the cell does not belong to the service area of the service. This is the basic state of the UTRAN 520, which transitions to a second state 102 upon receiving a session start message from the core network 30. The terminal 400 does not request service delivery from the UTRAN 520 in the NULL state.

The second state is a preparation (PR) state 102 in which the UTRAN 520 is in a state of preparing or setting up the radio environment upon receiving a service session start notification from the core network 30. This state starts when UTRAN 520 receives the service session start from the core network 30 and continues until the UTRAN informs the terminals 400 of the radio bearer that was determined for use within the cell, or that no radio bearer was setup.

In the PR state 102, the UTRAN 520 transmits notification to terminals 400 regarding the incoming service and performs a counting procedure to determine the type of radio bearer. The UTRAN 520 decides whether to set up a point-to-multipoint radio bearer, a point-to-point radio bearer or no radio bearer based on the number of terminals 400 that desire to receive the service in the cell.

Depending upon the determination made in the PR state 102, the UTRAN 520 transitions to one of three states. A point-to-point (PTP) state 103 is entered if a point-to-point radio bearer is set. A point-to-multipoint (PTM) state 104 is entered if a point-to-multipoint radio bearer is set. A no-transmission (NT) state 105 is entered if no radio bearer is set radio.

A point-to-multipoint radio bearer is set up if the number of terminals 400 that desire to receive the service is greater than or equal to a threshold value and a point-to-point radio bearer is set up if the number of terminals that desire to receive the service is less than the threshold value. If no radio bearer is set up because there are no terminals 400 desiring to receive the service, the terminals are so informed.

In the PTP state 103, the UTRAN 520 receives service data transmitted from the core network 30 and transmits the data to the terminals 400 by using the point-to-point radio bearer. The UTRAN 520 may change the radio bearer to a point-to-multipoint radio bearer when the number of terminals 400 requesting the service exceeds the threshold value and transition to the PTM state 104 after informing the terminals 400. The UTRAN 520 may release, or cancel, the point-to-point radio bearer when there are no users within the cell and transition to the NT 105 state after informing the terminals 400. When the MBMS service session is complete, the UTRAN 520 cancels the point-to-point radio bearer and transitions to the NULL state 101.

In the PTM state 104, the UTRAN 520 receives service data transmitted from the core network 30 and transmits the data to the terminals 400 by using the point-to-multipoint radio bearer. The UTRAN 520 may change the radio bearer to a point-to-point radio bearer when the number of terminals 400 requesting the service is below the threshold value and transition to the PTP state 103 after informing the terminals 400. The UTRAN 520 may release, or cancel, the point-to-multipoint radio bearer when there are no users within the cell and transition to the NT state 105 state after informing the terminals 400. When the MBMS service session is complete, the UTRAN 520 cancels the point-to-multipoint radio bearer and transitions to the NULL state 101.

In the NT state 105, there is radio bearer set up and the UTRAN 520 does not transmit service data because there is no terminal 400 that desires to receive the service within the cell although the session of the corresponding service has begun. The UTRAN 520 waits for a service data transmission request from one or more terminals 400.

If the UTRAN 520 receives service data transmission requests from a number of terminals 400 that is below the threshold value, a point-to-point radio bearer is set up and transition to the PTP state 103 occurs after informing the terminals. If the UTRAN 520 receives service data transmission requests from a number of terminals 400 that is greater than or equal to the threshold, a point-to-multipoint radio bearer is set up and transition to the PTM state 104 occurs after informing the terminals. When the MBMS service session is complete, the UTRAN 520 transitions to the NULL state 101.

Table 1 illustrates the types of information transmitted in each state to inform the terminals 400 of the current state of the UTRAN 520 in the first embodiment of the present invention.

In Table 1, "Yes" and "No" indicate whether UTRAN 520 transmits the corresponding data in each state. To allow a terminal 400 within the corresponding cell to receive the above-identified information, the UTRAN 520 periodically transmits the information via a common control channel, such as the MCCH or BCCH.

TABLE 1

|  | NULL state | PR state | PTM state | PTP state | NT state |
|---|---|---|---|---|---|
| Service ID | NO | YES | YES | YES | YES |
| Session Ongoing | NO | YES | YES | YES | YES |
| Bearer Type | NO | NO | YES (PTM) | YES (PTP) | YES (NT) |
| State Information | NO | YES | YES | YES | YES |

"Service ID" is a unique identity for discriminating each MBMS service. "Session ongoing" indicates whether a current session is in progress. "Bearer type" indicates the type of radio bearer set up by the system, for example whether the radio bearer is point-to-point, point-to-multipoint, or no radio bearer is set. "State information" indicates the current state of the UTRAN 520, which may be inferred from the "Session ongoing" information and "Bearer type" information. Therefore, the UTRAN 520 may not transmit "Session ongoing" information.

In order for a terminal 400 in mobility to determine the state of the UTRAN 520 in the first embodiment of the invention, the terminal first checks whether there is a "Service ID" among those that are received via a common control channel that matches the service the terminal desires to receive. If the terminal 400 cannot find the corresponding "Service ID," the terminal recognizes the NULL state for that particular service. If the terminal 400 finds the corresponding "Service ID," the terminal utilizes the "State Information" of the corresponding service to determine the state of the system.

Since the UTRAN 520 may not transmit "State Information," the terminal 400 may use the "Session Ongoing" information and the "Bearer type" information to determine the state of the UTRAN 520 for the corresponding service. After determining the state of the system, the terminal 400 operates in the accordance with the determined system state.

If the NULL state 101 is recognized, the terminal 400 determines that either the cell is not within a service region or a session of the corresponding service is not ongoing. The terminal 400 does not request the UTRAN 520 to transmit data of the service.

If the PR 102 state is recognized, the terminal 400 operates according to the messages transmitted via a common control channel. The terminal 400 can receive service notification transmitted by the UTRAN 520. If the UTRAN 520 is performing a counting procedure, the terminal 400 informs the UTRAN that it wishes to receive transmission of the service.

If the PTP state 103 is recognized, the terminal 400 obtains the point-to-point radio bearer information that is transmitted via the common control channel. The terminal 400 sets up its environment and receives the service data transmitted by the UTRAN 520.

If the PTM state 104 is recognized, the terminal 400 obtains the point-to-multipoint radio bearer information that is transmitted via the common control channel. The terminal 400 sets up its environment and receives the service data transmitted by the UTRAN 520.

If the NT state 105 is recognized, the terminal 400 requests the UTRAN 520 to transmit the corresponding MBMS service data. In the NT state 105, the UTRAN 520 does not transmit the corresponding MBMS service data within the location region because there are no terminals 400 within cell wishing to receive the MBMS service. Therefore, the terminal 400 must inform the UTRAN 520 that it desires to receive data of the corresponding service.

The terminal 400 sends a message requesting data transmission of the corresponding service including an identity of the service desired to the UTRAN 520. The UTRAN 520 then indicates the radio bearer information to the terminal 400 and the terminal sets up its environment according to the radio bearer information to receive the service data.

In a second embodiment of the present invention, UTRAN 520 operations for a particular broadcast and/or multicast service are divided into three phases. FIG. 7 illustrates a timeline of an MBMS service in accordance with the second embodiment of the present invention.

A cell stays in phase 1 if there is no ongoing session for the MBMS service or if the cell does not belong to the service area of the service. During phase 1, the UTRAN 520 is not involved in the MBMS service. A terminal 10 that has joined an MBMS service may regularly try to receive MBMS status information broadcast in the cell. The terminal 10 does not request service delivery from the UTRAN 520.

Phase 2 starts when the UTRAN 520 receives the MBMS session start from the CN 30. Phase 2 ends when the UTRAN 520 initially sets up MBMS radio bearers for the session or decides not to set up an MBMS radio bearer in a cell.

In phase 2, the UTRAN 520 transmits notification to the terminals 10 regarding the incoming service and performs a counting procedure to determine the type of MBMS radio bearer to set up. The UTRAN 520 decides whether to set up a point-to-multipoint radio bearer, a point-to-point radio bearer or no radio bearer based on the number of terminals 10 that desire to receive the service in the cell. A terminal 10 that has joined an MBMS service utilizes an RRC message on MCCH to request the service.

Phase 3 starts after initial MBMS radio bearer setup and ends when the UTRAN 520 receives the MBMS session stop from CN 30. In phase 3, the UTRAN 520 transmits the data for the MBMS service received from CN 30 using, if any, the established radio bearer. If there is no radio bearer set-up, the UTRAN 520 waits for a service delivery request from a terminal 10. Recounting and radio bearer reconfiguration can be performed during this phase.

The behavior of the UTRAN 520 in phase 3 can be divided into three states; a no-transmission state, a point-to-point transmission state, and a point-to-multipoint transmission state. Each cell has one of the three states. With the variation of the number of terminals 10, the state of a cell can transition between three states. The UTRAN 520 may broadcast those states to the terminals 10.

In the no-transmission state of a cell, there is no established radio bearer because there is no terminal 10 that desires to receive the service. An MBMS-joined terminal 10 in idle mode that moves into a cell having this state requests service delivery from the UTRAN 520 by transmitting a request message.

In the point-to-point state of a cell, a point-to-point radio bearer is established. A terminal 10 that has joined an MBMS service can receive MBMS data over a point-to-point radio bearer if there is MBMS data to receive.

In the point-to-multipoint state of a cell, a point-to-multipoint radio bearer is established. A terminal 10 that has joined an MBMS service can receive MBMS data over a point-to-multipoint radio bearer if there is MBMS data to receive.

Table 2 illustrates the types of information transmitted in each phase of MBMS in the second embodiment of the present invention to inform the terminals 400 of the current state of the UTRAN 520. In Table 2, "Yes" indicates that the UTRAN 520 transmits the data and the possible states are indicated, while "No" indicates that the UTRAN 520 does not transmit the data.

"Service ID" is a unique identity for the particular service provided. "Transmission State" indicates the state of the cell in the phase 3, for example what type (PTP, PTM or None) of transmission is in progress. "Counting" indicates whether the UTRAN 520 is currently performing a counting procedure. If "On" is indicated by "Counting, a terminal 400 transmits a request message to receive the service.

TABLE 2

|  | NULL Phase | PR Phase | PTM state | PTP state | NT state |
|---|---|---|---|---|---|
| Service ID | No | Yes | Yes | Yes | Yes |
| Transmission State | No | No | Yes (PTM) | Yes (PTP) | Yes (NONE) |
| Counting | No | Yes (Off/On) | Yes (Off/On) | Yes (Off/On) | Yes (Off/On) |

In order for a terminal 400 in mobility to determine the state of the UTRAN 520 in the second embodiment of the invention, the terminal first determines if a "Service ID" received via a common control channel matches the service identification for the service that the terminal desires to receive. A terminal 400 in mobility is a terminal, for example, that moved into a new cell or had its power newly turned on.

If the "Service ID" does not match the service identification of the desired service, the terminal 400 recognizes phase 1 for that particular service. The terminal 400 determines that the cell is either not within a service region or that a session of the corresponding service is not ongoing, and does not request the UTRAN 520 to transmit data of the service.

If the "Service ID" matches the service identification of the desired service, the terminal 400 utilizes the "Transmission State" of the corresponding service to determine the state of the system. Determining the state of the system allows the terminal 400 to either start reconfiguration of the radio bearer or transmit a service request to the UTRAN 520.

If the UTRAN 520 is in phase 2, the terminal 400 operates according to the messages transmitted via a common control channel. The terminal 400 can receive service notification transmitted by the UTRAN 520. If "Counting" indicates "On," a count is in progress and the terminal 400 informs the UTRAN 520 that it desires to receive transmission of the service by transmitting a service request to the UTRAN.

If the UTRAN is in phase 3, the terminal 400 utilizes the "Transmission State" to determine which type of radio bearer, if any, to establish. If "Transmission State" indicates PTP state, the terminal 400 establishes a point-to-point radio bearer. If "Transmission State" indicates PTM state, the terminal 400 establishes a point-to-multipoint radio bearer. If "Transmission State" indicates NONE, the terminal 400 sends a service request to the UTRAN 520.

Figure 8:
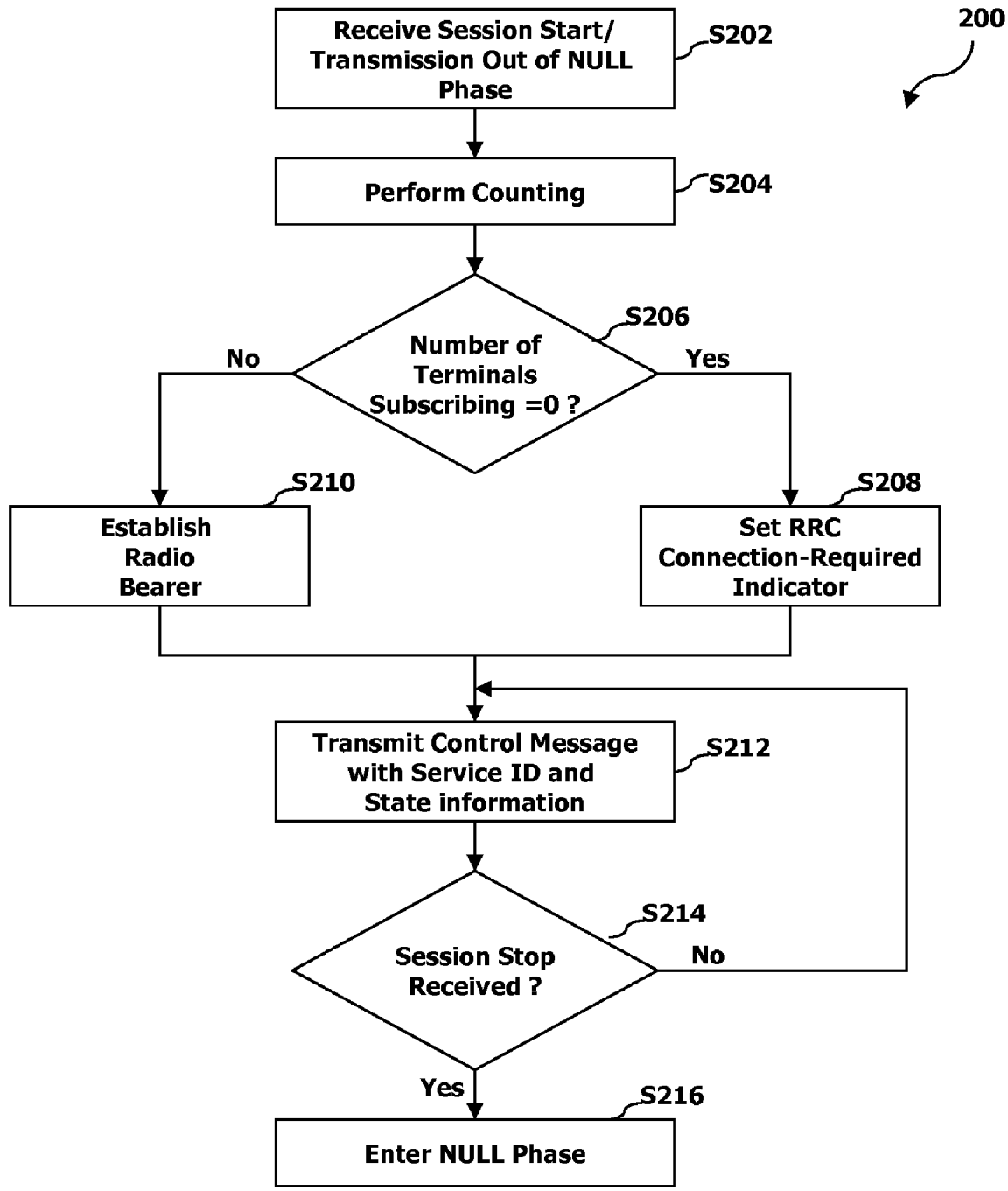
FIG. 8 illustrates a method for a network providing an MBMS service according to one embodiment of the present invention.

FIG. 8 illustrates a method 200 for a network providing an MBMS service according to one embodiment of the present invention. The method 200 includes receiving a session start indication (S202), initiating a counting process (S204) to determine the number of terminals 400 that subscribe to the service, determining based on the count (S206) whether to set a connection required indicator (S208) or establish a radio bearer (S210), transmitting a control message including the connection required indicator, service ID and state information, and upon receiving a session stop indication (S214), entering a NULL phase (S216).

Upon receiving a session start indication for a particular service from the CN 30 in step S202, the UTRAN 520 transitions from the NULL phase 101 to the PR phase 102. A count of terminals 400 presently subscribing to the particular service, for example an MBMS service, is initiated in step S204 and the results of the count are utilized in step S206 to determine whether a radio bearer is established or connection requests are solicited from terminals 400 in the cell.

If there are no terminals 400 in the cell presently subscribing to the service, an RRC connection-required indicator is set in step S208 and the UTRAN 520 transitions to the NT state 105. If there is at least one terminal 400 in the cell subscribing to the service, a radio bearer, such as an RRC connection between the UTRAN 520 and at least one terminal, is established in step S210 based on the number of subscribing terminals 400 and the UTRAN 520 transitions to the PTP state 103 or the PTM state 104.

A control message, such as an MBMS notification message, is transmitted to the terminals 400 in the cell in step S212. The control message includes the service ID of the particular service, the connection-required indicator and state information associated with the particular service.

If it is determined in step S214 that a session stop indication was received, the UTRAN 520 transitions to the NULL phase 101 in step S216. All established radio bearers are released, the connection-required indicator is reset and the service ID is no longer included in the control message.

The method 200 illustrated in FIG. 8 may also include the detection of a newly introduced terminal 400 in the cell. Upon detecting a newly introduced terminal 400, the UTRAN 520 either establishes a radio bearer with the terminal or sets an RRC connection-required indicator. If there are other terminals 400 presently subscribing to the service, a radio bearer is established. If there are no other terminals 400 presently subscribing to the service, the connection-required indicator is set.

Figure 9:
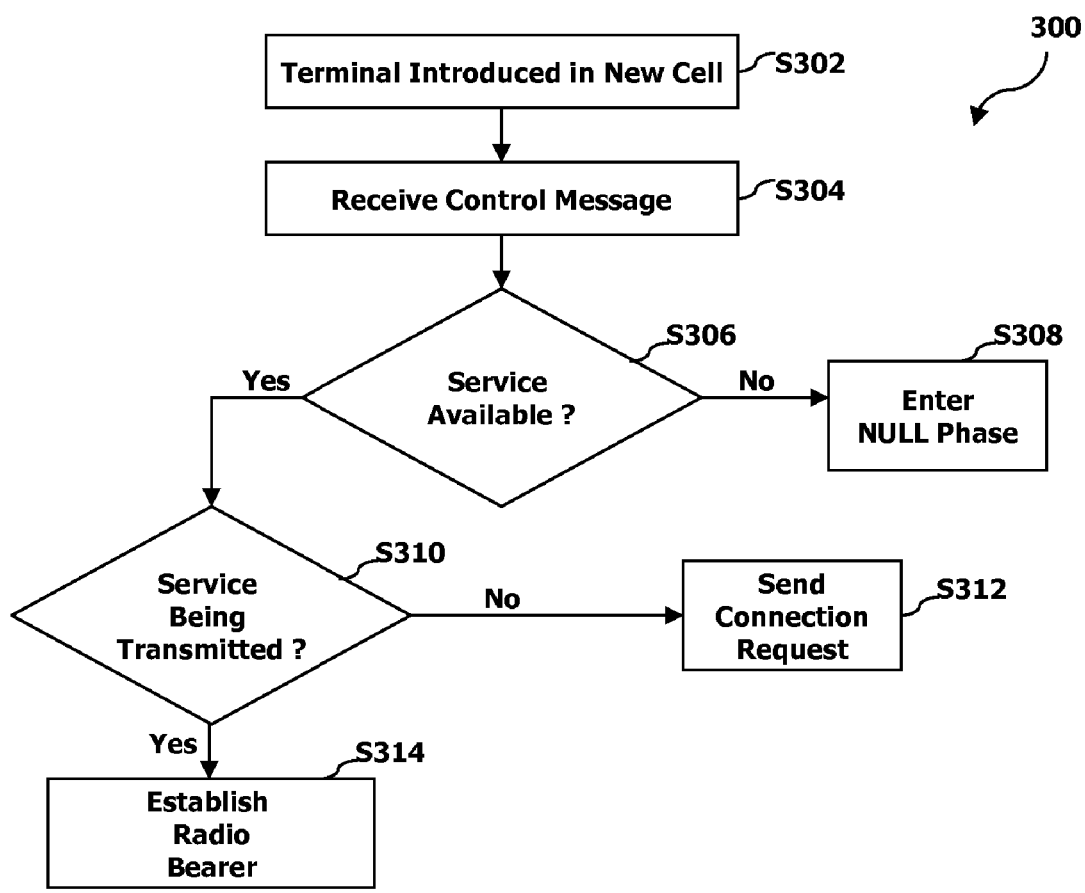
FIG. 9 illustrates a method for a terminal receiving an MBMS service according to one embodiment of the present invention.

FIG. 9 illustrates a method 300 for a terminal receiving an MBMS service according to one embodiment of the present invention. The method 300 includes a terminal 400 being newly introduced in a cell (S302), receiving a control message including a connection required indicator, service ID and state information (S304), determining whether a desired service is available (S306) and, if the service is available, determining whether the service is being transmitted (S310) in order to either send a service request (S312) or establish a radio bearer (S314). If the service is not available, the terminal enters a NULL phase 101 (S308)

A terminal 400 is newly introduced in a cell in step S302, for example by moving to a new cell or being powered up in the cell. The terminal 400 receives a control message, such as an MBMS notification message, from the UTRAN 520 in step S304. The control message includes the service ID of a particular service provided in the cell, a connection-required indicator and state information associated with the particular service.

The terminal 400 compares the service ID in the control message to the identification of the desired service in step S306 to determine if the desired service, for example an MBMS service, is available in the cell. If the service ID in the control message does not match the identification of the desired service, the desired service is not presently available in the cell. If the service ID in the control message matches the identification of the desired service, the desired service is available in the cell.

If the desired service is not available in the cell, the terminal 400 recognizes a NULL phase 101 for the desired service in step S308. The terminal 400 does not request the service from the UTRAN 520.

If the service ID in the control message matches the identification of the desired service, the terminal 400 recognizes that either the PR phase 102, the PTP state 102, the PTM state 103 or the NT state 105 exists for the desired service. The terminal 400 utilizes the state information and connection-required indicator in the control message to determine, in step S310, whether the service is presently being transmitted in the cell.

If the service in not presently being transmitted, the terminal recognizes that the NT state 105 exists for the service and transmits a request message to the UTRAN 520 in step S312. The request message is preferably associated with the service, for example an RRC connection request message.

If the service is being transmitted, the terminal establishes a radio bearer, for example an RRC connection between the terminal 400 and UTRAN 520, to receive the service in step S314. The radio bearer is a point-to-point radio bearer if the PTP state 103 exists and a point-to-multipoint radio bearer if the PTM state 104 exists.

Figure 10:
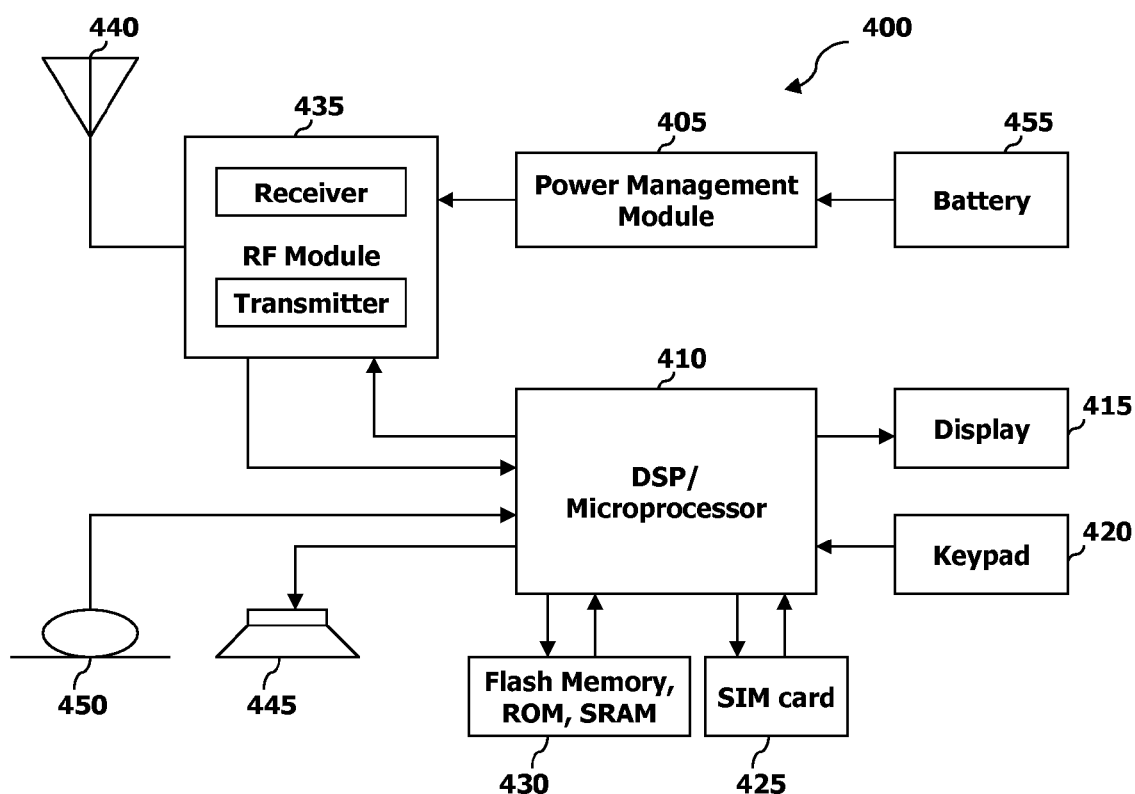
FIG. 10 illustrates a terminal for receiving an MBMS service according to one embodiment of the present invention.

FIG. 10 illustrates a block diagram of a terminal 400 according to one embodiment of the present invention. The terminal 400 comprises a processor or digital signal processor 410, RF module 435, power management module 405, antenna 440, battery 455, display 415, keypad 420, memory 430, SIM card 425 (which may be optional), speaker 445 and microphone 450.

A user enters instructional information, such as a telephone number, for example, by pushing the buttons of a keypad 420 or by voice activation using the microphone 450. The processor 410 receives and processes the instructional information to perform the appropriate function, such as to dial the telephone number. Operational data may be retrieved from the Subscriber Identity Module (SIM) card 425 or the memory module 430 to perform the function. Furthermore, the processor 410 may display the instructional and operational information on the display 415 for the user's reference and convenience. Moreover, the processor 410 is adapted to perform the method illustrated in FIG. 9.

The processor 410 issues instructional information to the RF module 435, to initiate communication, for example, transmit radio signals comprising voice communication data or transmit an RRC connection request message as described herein. The RF module 435 comprises a receiver and a transmitter to receive and transmit radio signals. An antenna 440 facilitates the transmission and reception of radio signals. Upon receiving radio signals such as an MBMS notification message from the network as described herein, the RF module 435 may forward and convert the signals to baseband frequency for processing by the processor 412. The processed signals may also be transformed into audible or readable information outputted via the speaker 445, for example if the radio signals are an incoming phone call.

Figure 11:
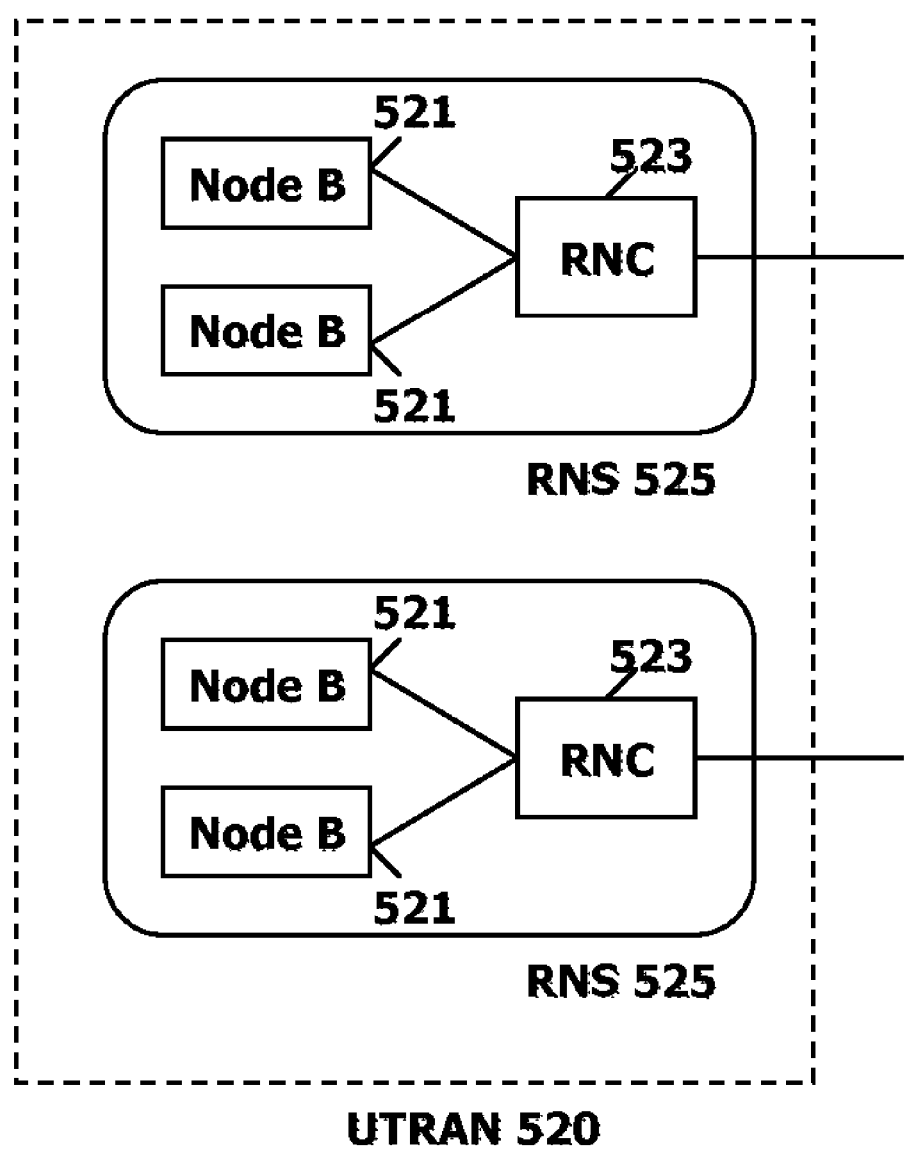
FIG. 11 illustrates a network for providing an MBMS service according to one embodiment of the present invention.

FIG. 11 illustrates a block diagram of a UTRAN 520 according to the preferred embodiment of the present invention. The UTRAN 520 includes one or more radio network sub-systems (RNS) 525. Each RNS 525 includes a radio network controller (RNC) 523 and a plurality of Node-Bs (base stations) 521 managed by the RNC. The RNC 523 handles the assignment and management of radio resources and operates as an access point with respect to the core network 30. Furthermore, the RNC 523 is adapted to perform the method illustrated in FIG. 8.

The Node-Bs 521 receive information sent by the physical layer of the terminal 410 through an uplink, and transmit data to the terminal through a downlink. The Node-Bs 521 operate as access points, or as a transmitter and receiver, of the UTRAN 520 for the terminal 410.

In the related art, with regards to a particular MBMS service, a terminal 10 cannot know the state of the cell in which it is located. According to the present invention, the system informs a terminal 400 of its state for the particular MBMS service and the terminal operates in accordance with this state information of the system. Therefore, unnecessary operations of the terminal 400 can be prevented and unnecessary signaling and waste of radio resources can be minimized.

For a terminal 400 that receives a particular service, the present invention provides a communication system wherein the terminal receives, state information associated with the particular service from the system. In particular, for a terminal 400 that receives a broadcast and/or multicast service via a downlink channel, the present invention provides a system wherein the terminal receives state information associated with a particular broadcast and/or multicast service that the terminal desires to receive from the UTRAN 520 within a location region. When the terminal 400 wishes to receive a particular broadcast and/or multicast service from a new location region into which the terminal has moved, the terminal determines the UTRAN 520 state and operates accordingly.

It will be apparent to one skilled in the art that the preferred embodiments of the present invention can be readily implemented using, for example, the processor 410 or other data or digital processing device, either alone or in combination with external support logic.

Although the present invention is described in the context of mobile communication, the present invention may also be used in any wireless communication systems using mobile devices, such as PDAs and laptop computers equipped with wireless communication capabilities. Moreover, the use of certain terms to describe the present invention should not limit the scope of the present invention to certain type of wireless communication system, such as UMTS. The present invention is also applicable to other wireless communication systems using different air interfaces and/or physical layers, for example, TDMA, CDMA, FDMA, WCDMA, etc.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The logic implementation shown in the figures described specific operations as occurring in a particular order. In alternative implementations, certain of the logic operations may be performed in a different order, modified or removed and still implement preferred embodiments of the present invention. Moreover, steps may be added to the above described logic and still conform to implementations of the invention.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method of communicating with a network in a wireless communication system, the method comprising:

receiving, by a terminal, a service identifier for identifying a multimedia broadcast/multicast service (MBMS) service provided by a network;

receiving, by the terminal, a parameter from the network for indicating a state of the MBMS service, wherein the state is one of a point-to-multipoint state, a point-to-point state and a no-transmission state;

requesting, by the terminal, transmission of data of the MBMS service from the network if the service identifier identifies the MBMS service and the parameter indicates the no-transmission state; and receiving, by the terminal, the data of the MBMS service if the parameter indicates the point-to-multipoint state;

wherein the service identifier and the parameter are received through a MBMS control channel (MCCH) or a broadcast control channel (BCCH), wherein requesting transmission of the data of the MBMS service, by the terminal, comprises transmitting a Radio Resource Control (RRC) connection request message to the network, and wherein the method is performed when the terminal is in phase 3, which starts after initial MBMS radio bearer set-up and ends when the network receives a MBMS session stop indication from a core network.

2. The method of claim 1, wherein a current state of the MBMS service for a particular cell can transition to another state according to a variation in the number of terminals in that particular cell.

3. A method of communicating with terminals in a wireless communication system, the method comprising:

performing, by a network, a counting procedure for counting a number of terminals that subscribed to a multimedia broadcast/multicast service (MBMS) service upon the network receiving a session start indication of the MBMS service from a core network;

determining, by the network, a state of the MBMS service based on the counted number of terminals, wherein the state is one of a point-to-multipoint state, a point-to-point state and a no-transmission state; and transmitting, by the network, a service identifier for identifying the MBMS service provided by the network, and a parameter indicating the determined state of the MBMS service;

setting, by the network, the parameter to the no-transmission state if there are no terminals subscribed to the MBMS service, wherein the service identifier and the parameter are transmitted through a MBMS control channel (MCCH) or a broadcast control channel (BCCH), wherein network operations for the MBMS service comprise: a first phase during which the network is not involved with the MBMS service, if there is no ongoing session for the MBMS service, or if the terminal does not belong to a service area of the MBMS service;

a second phase during which the network transmits a notification to the terminal regarding the MBMS service and performs the counting procedure to determine a type of MBMS radio bearer that is to be set up; and a third phase during which the network transmits data of the MBMS service;

wherein the third phase starts after initial MBMS radio bearer setup and ends when the network receives an MBMS session stop from a core network, and wherein the third phase comprises the point-to-multipoint state, the point-to-point state, and the no-transmission state.

4. The method of claim 3, wherein a current state of the MBMS service for a particular cell can transition to another state according to a variation in the number of terminals in that particular cell.

* * * * *